(12) United States Patent
Tao et al.

(10) Patent No.: US 10,901,435 B2
(45) Date of Patent: *Jan. 26, 2021

(54) HEADING GENERATION METHOD AND SYSTEM OF UNMANNED AERIAL VEHICLE

(71) Applicant: SZ DJI TECHNOLOGY CO., LTD., Shenzhen (CN)

(72) Inventors: Ye Tao, Shenzhen (CN); Jianyu Song, Shenzhen (CN); Renli Shi, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 152 days.

This patent is subject to a terminal disclaimer.

(21) Appl. No.: 16/186,071

(22) Filed: Nov. 9, 2018

(65) Prior Publication Data

US 2019/0079541 A1 Mar. 14, 2019

Related U.S. Application Data

(63) Continuation of application No. 15/125,509, filed as application No. PCT/CN2014/078925 on May 30, 2014, now Pat. No. 10,156,855.

(51) Int. Cl.
*G05D 1/10* (2006.01)
*G05D 1/00* (2006.01)
(Continued)

(52) U.S. Cl.
CPC ........... *G05D 1/101* (2013.01); *B64C 39/024* (2013.01); *G05D 1/0044* (2013.01);
(Continued)

(58) Field of Classification Search
CPC .. G05D 1/0808; G05D 1/0044; G05D 1/0094; G05D 1/101; G08G 5/0034;
(Continued)

(56) References Cited

U.S. PATENT DOCUMENTS 8,831,799 B1 * 9/2014 Levine ................. G05D 1/0676
701/18
9,020,662 B2 4/2015 Felix et al.
(Continued)

FOREIGN PATENT DOCUMENTS

| CN | 101634554 | 1/2010 |
| CN | 101782385 | 7/2010 |

(Continued)

OTHER PUBLICATIONS

F. Qiu et al. (Apr. 2014). "Development of the UAV route planning software based on GIS," Journal of Shenyeng .Aerospace University vol. 31 . . . No. 2, pp. 1-4.
(Continued)

*Primary Examiner* — Mary Cheung
(74) *Attorney, Agent, or Firm* — Finnegan, Henderson, Farabow, Garrett & Dunner, LLP (57) ABSTRACT

The present invention discloses a heading generation method of an unmanned aerial vehicle including the following steps of: making a preliminary flight for selecting a point of view to record flight waypoints, the waypoints including positioning data and flight altitude information of the unmanned aerial vehicle; receiving and recording flight waypoints of the unmanned aerial vehicle; generating a flight trajectory according to waypoints of the preliminary flight; editing the flight trajectory to obtain a new flight trajectory; and transmitting the edited new flight trajectory to the unmanned aerial vehicle to cause the unmanned aerial vehicle to fly according to the new flight trajectory. The present invention further relates to a heading generation system of an unmanned aerial vehicle.

19 Claims, 3 Drawing Sheets

(51) Int. Cl.
*G08G 5/00* (2006.01)
*B64C 39/02* (2006.01)
*G05D 1/08* (2006.01)

(52) U.S. Cl.
CPC ......... *G05D 1/0094* (2013.01); *G05D 1/0808* (2013.01); *G08G 5/0034* (2013.01); *G08G 5/0039* (2013.01); *G08G 5/0069* (2013.01); *B64C 2201/127* (2013.01); *B64C 2201/14* (2013.01)

(58) Field of Classification Search
CPC .. G08G 5/0069; G08G 5/0039; B64C 39/024; B64C 2201/14; B64C 2201/127
See application file for complete search history.

(56) References Cited

U.S. PATENT DOCUMENTS

| | | | |
|---|---|---|---|
| 9,070,285 | B1 | 6/2015 | Ramu et al. |
| 9,477,230 | B2* | 10/2016 | Sastre I Sastre ...... G01C 25/00 |
| 2006/0015247 | A1 | 1/2006 | Speer |
| 2006/0265109 | A1 | 11/2006 | Canu-Chiesa et al. |
| 2008/0288164 | A1* | 11/2008 | Lewis .................. G08G 5/0034 |
| | | | 701/120 |
| 2009/0105943 | A1 | 4/2009 | Ferro et al. |
| 2009/0157288 | A1* | 6/2009 | Bailey .................. G08G 5/0039 |
| | | | 701/121 |
| 2010/0324812 | A1* | 12/2010 | Sacle ...................... G01C 21/00 |
| | | | 701/467 |
| 2011/0304737 | A1 | 12/2011 | Evans et al. |
| 2012/0022723 | A1 | 1/2012 | Botargues et al. |
| 2012/0158219 | A1 | 6/2012 | Durling et al. |
| 2012/0316685 | A1 | 12/2012 | Pettersson |
| 2013/0080043 | A1* | 3/2013 | Ballin .................. G08G 5/0078 |
| | | | 701/120 |
| 2013/0085661 | A1* | 4/2013 | Chan .................... G08G 5/0082 |
| | | | 701/122 |
| 2013/0338909 | A1 | 12/2013 | de Blanes et al. |
| 2013/0338910 | A1 | 12/2013 | Vilaplana et al. |
| 2015/0153740 | A1 | 6/2015 | Ben-Shachar et al. |
| 2015/0262490 | A1 | 9/2015 | Deker et al. |
| 2015/0323933 | A1 | 11/2015 | Darbois et al. |

FOREIGN PATENT DOCUMENTS

| | | |
|---|---|---|
| CN | 202050188 | 11/2011 |
| CN | 103235602 | 8/2013 |
| CN | 104035446 | 9/2014 |
| JP | 2012-140101 | 7/2012 |
| WO | WO-2007/047953 | 4/2007 |

OTHER PUBLICATIONS

International Search Report dated Feb. 26, 2015, in corresponding International Application No. PCT/CN2014/078925 issued by the State Intellectual Property Office of the PR China; 6 pages.

* cited by examiner

FIG. 1

Before editing of the flight route

After editing of the flight route

HEADING GENERATION METHOD AND SYSTEM OF UNMANNED AERIAL VEHICLE

CROSS REFERENCE TO RELATED APPLICATIONS

This application is a continuation of U.S. patent application Ser. No. 15/125,509, filed on Sep. 12, 2016, which is a national-phase application of International Application No. PCT/CN2014/078925, filed on May 30, 2014. Each of the aforementioned applications is incorporated herein by reference in its entirety.

BACKGROUND OF THE INVENTION

The present invention relates to the field of unmanned aerial vehicles, and in particular, to a heading generation method and system of an unmanned aerial vehicle.

In aerial photography missions, what plays a key role in the aerial photography is selecting a point of view. Like the traditional photographing and video recording, the location and angle of a point of view as well as shooting parameters decide the quality and artistry of the shots to a great extent. In the traditional fixed-point photographing and video recording, a photographer can easily adjust a video camera at a fixed location. Shooting is carried out until he/she finds a satisfactory point of view and parameters. When the shot is taken, it can be moved on to the next scene. Shooting and determining the point of view in one scene do not interfere with another scene. Different from the traditional photographing and video recording, in aerial shooting, the video camera is not static but in a continuous real-time moving state, in which both the point of view and parameters at any time of the flight are needed to be accurate. It is more difficult to ensure such accuracy than in the traditional fixed-point photographing and video recording, because the photographer has no chance of repeatedly adjusting the point of view and making comparison of the views after the flight begins. The flight has to be completed in one take once it has begun, unless post-editing is conducted when the flight route is navigated multiple times. How a task of continuous shooting a plurality of target objects or scenes is completed and how an aircraft with its onboard aerial photography apparatus completes high quality shooting quickly involve flight trajectory planning of the aerial photography aircraft. That is, it is a flight route generation problem for aerial photography.

There are two kinds of existing flight route generation methods for aerial photography. In one method, an optimal flight route is directly selected from multiple test flights carried out by a flight operator by comparing the test flights. On-site control of the flight operator is relied on during shooting. In the other method, a target flight route is generated by first setting target waypoints and shooting angles on a map, and then, through manual operations or computer control, having the aircraft completing the flight over the target waypoints according to a certain order.

For the first flight route generation method for aerial photography, since it is difficult for the operator's operation to achieve a precise and perfect effect all the time, the flight operator will need to carry out shooting around a target object or scene in multiple flights. This not only increases the time of flight operation and the cost of employing the flight operator, but also makes it difficult to ensure the quality of shooting. An especially skilled pilot can control the flight route precisely, but such an operator is very rare, and, at the same time, it is also difficult to have a professional photographer efficiently cooperate and communicate with the pilot. For the second method, although dependence on the pilot is reduced, setting waypoints on the map manually could lead to some blind spots simply because it is impossible to get what you see on the map. The manually-set waypoints cannot guarantee the optimal shooting distance and angle, and cannot guarantee the high efficiency of continuous shooting. If an object not marked on the map is present, for example, a tree or a new building, the manner of planning a flight route on the map may bring about a potential safety hazard. For example, the aircraft could crash into the building during an actual flight.

BRIEF SUMMARY OF THE INVENTION

A technical problem to be mainly solved in the present invention is to provide a heading generation method and system of an unmanned aerial vehicle, which can replace manual real-time precise control over the aircraft at a shooting site to greatly shorten the time of man-made flight operation and avoid influences of human factors on the quality of aerial photography. At the same time, the heading generation method and system of an unmanned aerial vehicle can avoid the blindness caused by setting waypoints on the map, thus guaranteeing the optimal shooting angle and distance and ensuring that the aircraft and its onboard apparatus can rapidly and efficiently complete high-quality aerial photography assignments.

To solve the foregoing technical problem, a technical solution adopted in the present invention is as follows: a heading generation method of an unmanned aerial vehicle is provided, including the following steps of: making a preliminary flight for selecting a point of view to receive and record flight waypoints of the unmanned aerial vehicle, the waypoints including positioning data and flight altitude information of the unmanned aerial vehicle; generating a flight trajectory according to waypoints of the preliminary flight; editing the flight trajectory to obtain a new flight trajectory; and transmitting the edited new flight trajectory to the unmanned aerial vehicle to cause the unmanned aerial vehicle to fly according to the new flight trajectory.

The method further includes a step of: editing attitude information of an imaging device, and transmitting the edited attitude information of the imaging device to the unmanned aerial vehicle to cause the imaging device to take a photograph according to an edited attitude.

The unmanned aerial vehicle is provided thereon with a gimbal, which includes at least one turning shaft. The imaging device is disposed on the gimbal and is rotatable with rotation of the gimbal, and the editing attitude information of an imaging device is editing a rotation angle of the at least one turning shaft of the gimbal.

The method further includes a step of: editing a shooting parameter of an imaging device, and transmitting the edited shooting parameter of the imaging device to the unmanned aerial vehicle to cause the imaging device to take a photograph according to the edited shooting parameter.

The flight trajectory of the unmanned aerial vehicle is positioned by smoothly transitioning collected discrete point data to form a smooth curve.

The flight trajectory of the unmanned aerial vehicle is positioned as a line through respective sampling points.

The method further includes a step of: recording image information of an image captured by an imaging device, displaying, in combination with a map, positioning data, and flight altitude information of the unmanned aerial vehicle at one point of the trajectory, attitude information of the imaging device, and an image captured by the imaging device corresponding to the point, and editing the new flight trajectory.

The flight trajectory includes a plurality of nodes corresponding to positions where the unmanned aerial vehicle hovers, and a smooth optimized flight route is generated between two disconnected nodes in a manner of editing the flight trajectory into a Bezier curve.

The method further includes a step of: editing attitude information of the unmanned aerial vehicle, and transmitting the edited attitude information of the unmanned aerial vehicle to the unmanned aerial vehicle to cause the unmanned aerial vehicle to fly according to an edited attitude.

The editing attitude information of the unmanned aerial vehicle is editing pitch angle information, roll angle information, and yaw angle information of the unmanned aerial vehicle.

To solve the foregoing technical problem, a technical solution adopted in the present invention is as follows: a heading generation system of an unmanned aerial vehicle is provided, including: a receiving module for receiving and recording flight waypoints of a preliminary flight of the unmanned aerial vehicle, the flight waypoints including positioning data of the unmanned aerial vehicle and flight altitude information of the unmanned aerial vehicle; a flight trajectory generation module for calculating a flight trajectory of the unmanned aerial vehicle according to the flight waypoints received by the receiving module; a flight trajectory editing module for editing the flight trajectory of the unmanned aerial vehicle calculated by the flight trajectory generation module to obtain a new flight trajectory; and a transmission module for transmitting the new flight trajectory edited by the flight trajectory editing module to the unmanned aerial vehicle to cause the unmanned aerial vehicle to fly according to the new flight trajectory.

The unmanned aerial vehicle is provided thereon with a gimbal for carrying an imaging device. The heading generation system further includes a gimbal attitude editing module. The receiving module receives and records image information of an image captured by the imaging device, and the gimbal attitude editing module edits attitude information of the imaging device.

The gimbal on the unmanned aerial vehicle includes at least one turning shaft. The imaging device is disposed on the gimbal and is rotatable with rotation of the gimbal, and the editing attitude information of the imaging device is editing a rotation angle of the at least one turning shaft.

The heading generation system further includes a shooting parameter editing module for editing a shooting parameter of the imaging device, and the transmission module transmits the edited shooting parameter to the unmanned aerial vehicle to cause the imaging device to take a photograph according to the edited shooting parameter.

The flight trajectory generation module positions the flight trajectory of the unmanned aerial vehicle by smoothly transitioning collected discrete point data to form a smooth curve.

The flight trajectory generation module positions the flight trajectory of the unmanned aerial vehicle as a line through respective sampling points.

The flight trajectory includes a plurality of nodes corresponding to positions where the unmanned aerial vehicle hovers, and the flight trajectory editing module generates a smooth optimized flight route between two nodes in a manner of editing the flight trajectory into a Bezier curve.

The waypoints further include attitude information of the unmanned aerial vehicle. The heading generation system further includes an unmanned aerial vehicle attitude editing module for editing the attitude information of the unmanned aerial vehicle, and the transmission module is further used for transmitting the attitude information of the unmanned aerial vehicle edited by the unmanned aerial vehicle attitude editing module to the unmanned aerial vehicle.

The unmanned aerial vehicle attitude editing module is used for editing pitch angle information, roll angle information, and yaw angle information of the unmanned aerial vehicle.

The present invention has the following beneficial effects. As different from the situation in the prior art, in the heading generation system of an unmanned aerial vehicle according to the present invention, the flight trajectory editing module edits a flight trajectory of the unmanned aerial vehicle calculated by the flight trajectory generation module to obtain a new flight trajectory, which thus can replace manual real-time precise control over the aircraft at a shooting site to greatly shorten the time of man-made flight operation and avoid influences of human factors on the quality of aerial photography. At the same time, the heading generation system of an unmanned aerial vehicle according to the present invention can avoid the blindness caused by setting waypoints on the map, thus guaranteeing the optimal shooting angle and distance and ensuring that the aircraft and its onboard apparatus can rapidly and efficiently complete high-quality aerial photography assignments.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The technical solution in embodiments of the present invention is clearly and completely described below with reference to the accompanying drawings of the embodiments of the present invention. It is apparent that the embodiments described are merely some embodiments of the present invention instead of all the embodiments. Based on the embodiments in the present invention, all other embodiments obtained by persons of ordinary skill in the art without making creative efforts should fall within the protection scope of the present invention.

Figure 1:
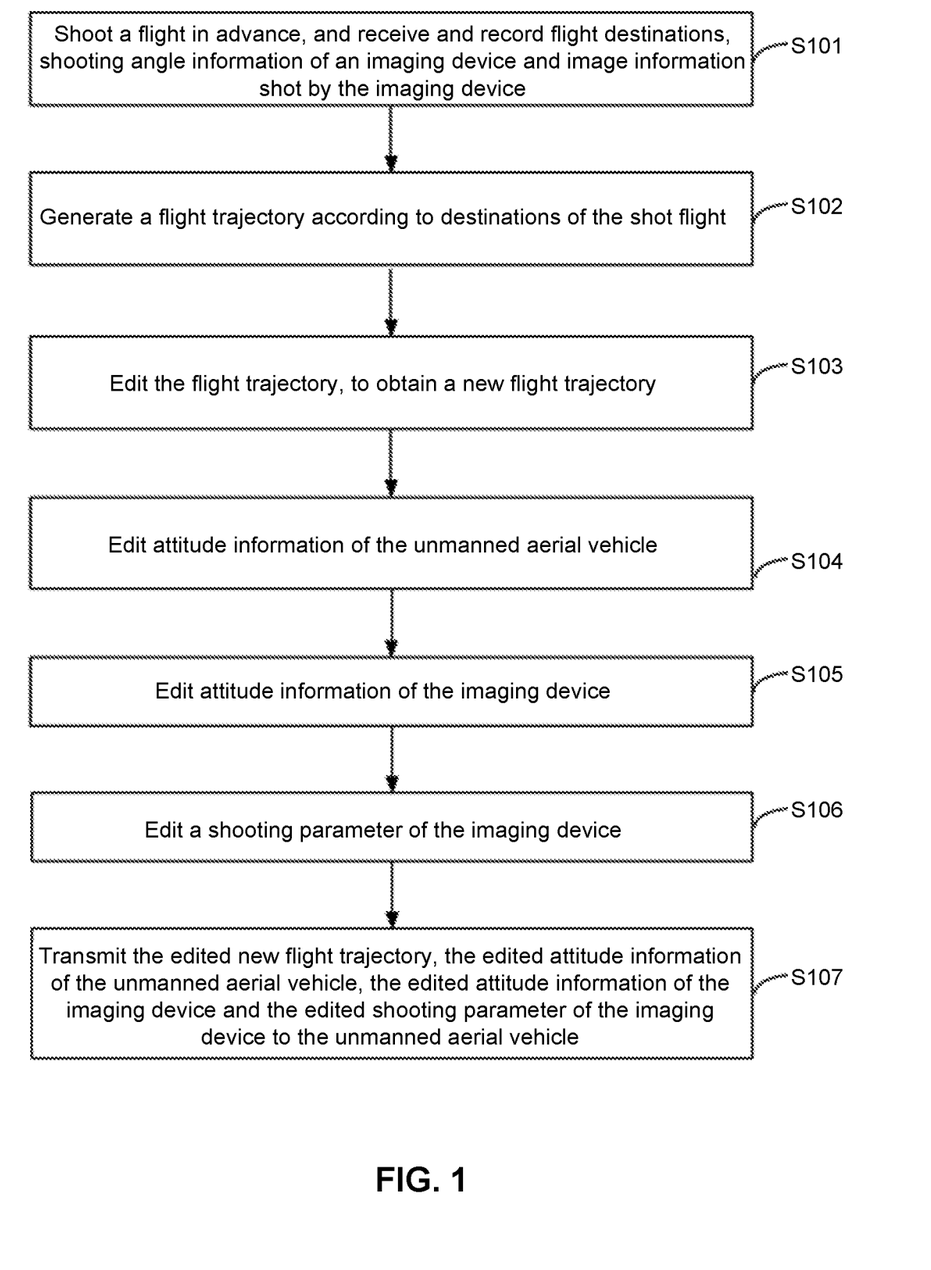
FIG. 1 is a flow chart of a heading generation method of an unmanned aerial vehicle according to an embodiment of the present invention.

Refer to FIG. 1, which is a flow chart of a heading generation method of an unmanned aerial vehicle according to an embodiment of the present invention. The unmanned aerial vehicle is provided thereon with a gimbal, a GPS positioning device, an inertial measurement unit (IMU), an altitude measurement device and the like. The gimbal is used for carrying an imaging device, for example, a video camera, a camera, a telescope, a remote video camera, a measuring instrument or the like, for achieving fixing of the imaging device and randomly adjusting the attitude of the imaging device (for example, changing a tilt angle or a shooting direction of the imaging device) to achieve high-quality shooting and/or photographing and the like. The gimbal is also provided thereon with a gimbal attitude sensor (GCU or IMU) for sensing the attitude of the gimbal. The heading generation method of the unmanned aerial vehicle includes the following steps.

S101: A preliminary flight for selecting a point of view is made to receive and record flight waypoints, shooting angle information of an imaging device, parameters set for the imaging device, and image information of an image captured by the imaging device, the waypoints including positioning data and flight altitude information of the unmanned aerial vehicle.

In an embodiment of the present invention, an operator of the unmanned aerial vehicle remotely controls the unmanned aerial vehicle to fly in the vicinity of a target to collect related waypoint information of shooting and selecting point of view. In some key places, the flight operator controls the unmanned aerial vehicle to hover, and the operator adjusts the position, altitude, and attitude of the unmanned aerial vehicle, the attitude of the gimbal, and parameters of the imaging device similarly to the traditional fixed-point photographing. As there is plenty of time and scenes are independent of one another, the photographer can establish a point of view of a high quality. The GPS positioning device of the unmanned aerial vehicle is used for acquiring the position of the unmanned aerial vehicle, and the inertial measurement unit (IMU) is used for collecting flight attitudes of the unmanned aerial vehicle. The parameters of the imaging device include an aperture, a shutter and the like.

S102: A flight trajectory is generated according to the waypoints of the flight for selecting a point of view.

When the unmanned aerial vehicle is in the course of flight, the flight trajectory of the unmanned aerial vehicle is calculated according to positioning data of the unmanned aerial vehicle collected by the GPS positioning device, flight altitude information of the unmanned aerial vehicle collected by the altitude measurement device, and flight attitudes of the unmanned aerial vehicle collected by the inertial measurement unit. This is a process of fitting a continuous trajectory through points in discrete positions in a coordinate system. In general, there are two practices as follows.

The first practice is connecting points in adjacent positions in a coordinate system with a straight line. That is, it is a method of linear interpolation. When there are enough sampling points on a curve trajectory, a line passing through the sampling points can be regarded as an approximate trajectory.

The second practice is approximately locating the flight trajectory of the unmanned aerial vehicle by smoothly transitioning collected discrete point data to form a smooth curve. That is, it is a method of nonlinear interpolation. At present, what is widely applied to engineering is polynomial interpolation, and such a method can reduce errors between a fitted curve and an actual trajectory curve to some extent.

In this embodiment, the flight trajectory is a Bezier curve. The flight trajectory includes a plurality of nodes corresponding to the positions where the unmanned aerial vehicle hovers.

In this embodiment, the flight trajectory of the unmanned aerial vehicle, shooting angle information of the imaging device, the parameters set for the imaging device, and the image information of an image captured by the imaging device of the unmanned aerial vehicle are received and recorded through a ground receiving terminal, for example, a mobile phone or a handheld device (e.g., iPad).

In other embodiments, it is also feasible to record flight waypoints and the shooting angle information of the imaging device directly through the unmanned aerial vehicle and transmit them to a computer which receives and records the flight waypoints and the shooting angle information of the imaging device.

In other embodiments, the waypoints may also only include positioning data and flight altitude information of the unmanned aerial vehicle, but does not include flight attitude information of the unmanned aerial vehicle. Therefore, the flight trajectory of the unmanned aerial vehicle is calculated only using the positioning data and flight altitude information of the unmanned aerial vehicle.

S103: The flight trajectory is edited to obtain a new flight trajectory.

The flight trajectory of the unmanned aerial vehicle, the shooting angle information of the imaging device and the image information of an image captured by the imaging device are all transmitted to a computer. In this embodiment, when the operator randomly clicks on a point on the flight trajectory through a mouse cursor, the computer may display, in combination with a map, positioning data and flight altitude information of the unmanned aerial vehicle at the point of the trajectory, attitude information of the unmanned aerial vehicle, attitude information of the imaging device, parameters set for the imaging device and an image captured by the imaging device corresponding to the point.

Figure 2:
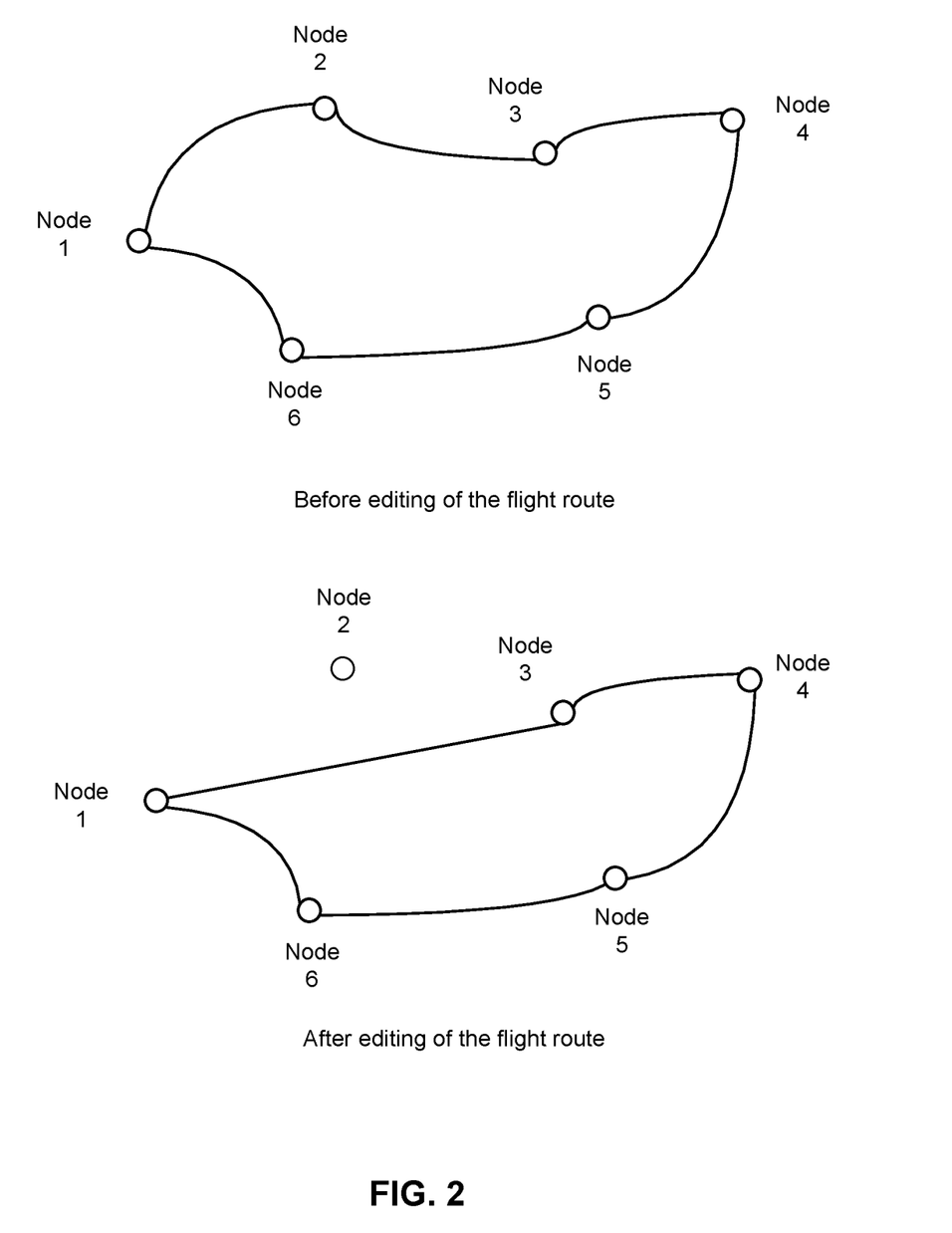
FIG. 2 illustrates diagrams of a flight trajectory generated with the method in FIG. 1 and an edited trajectory.

The flight trajectory includes a plurality of nodes corresponding to the positions where the unmanned aerial vehicle hovers, for example, as shown in FIG. 2, a node 1, a node 2, a node 3, a node 4, a node 5, and a node 6. The operator can see, on the computer, positioning data, flight altitude information and flight attitude information of the unmanned aerial vehicle at any point of the trajectory, the attitude information of the imaging device, the parameters set for the imaging device, and the image captured by the imaging device corresponding to the point. Therefore, on the premise that the flight trajectory is not a straight line, when the operator hopes that the unmanned aerial vehicle does not pass through the node 2 the next time it flies, the operator directly connects two adjacent nodes of the node not to be passed, for example, the node 1 and the node 3, with a straight line to generate a smooth optimized flight route between the node 1 and the node 3. It can be understood that the node may also be any point selected on the flight trajectory, which is not limited to the position where the unmanned aerial vehicle hovers.

Under other circumstances, when the operator hopes that the unmanned aerial vehicle does not pass through the node 2 and the node 3 the next time it flies, the operator directly connects the two nodes thus disconnected in the flight trajectory, for example, the node 1 and the node 4, with a straight line.

It can be understood that the manner of editing a new flight trajectory is not limited to the manner of connecting with a straight line, and it is also feasible to adopt a manner of editing the flight trajectory into a Bezier curve between any two nodes to generate a smooth optimized flight route. Using a Bezier curve to achieve fitting has the following reasons. One reason is that it is very convenient to define a curve trajectory through Bezier control points. Since it happens to be that the control points can be combined with characteristics of the aircraft in an actual movement (for example, velocity, direction and the like), it is natural that the flight trajectory can be more closely approximated. The other reason is that the Bezier curve may also maintain good smoothness in piecewise interpolation, and the overall effect is better than other piecewise interpolation methods.

S104: Attitude information of the unmanned aerial vehicle is edited.

In this embodiment, the waypoints further include flight attitude information of the unmanned aerial vehicle. The flight attitude information of the unmanned aerial vehicle such as pitch angle information, roll angle information, and yaw angle information of the unmanned aerial vehicle, is edited. In this embodiment, when the attitude information of the unmanned aerial vehicle is edited at one node, the unmanned aerial vehicle acts according to the edited attitude from that node to the next node. It can be understood that, in other embodiments, it is also feasible that, when the attitude information of the unmanned aerial vehicle is edited at one node, the unmanned aerial vehicle acts according to the edited attitude of the unmanned aerial vehicle for the whole flight route.

S105: Attitude information of the imaging device is edited.

In this embodiment, the gimbal on the unmanned aerial vehicle is a three-axis gimbal, which includes a pitch axis, a roll axis, and a yaw axis. The imaging device is disposed on the gimbal and is rotatable with rotation of the gimbal. For any node, a rotation parameter of the gimbal is edited. That is, a rotation angle of the three axes is edited as required. In this embodiment, when attitude information of the gimbal is edited at one node, the gimbal acts according to the edited rotation parameter of the gimbal from that node to the next node. It can be understood that, in other embodiments, it is also feasible that, when attitude information of the gimbal is edited at one node, the gimbal acts according to the edited rotation parameter of the gimbal for the whole flight route.

In other embodiments, the gimbal may also be a single-axis or two-axis gimbal.

S106: A shooting parameter of the imaging device is edited.

The shooting parameter of the imaging device includes the size of the aperture, the size of the shutter and the like. In this embodiment, when the shooting parameter of the imaging device is edited at one node, the imaging device shoots according to the edited shooting parameter from that node to the next node. It can be understood that, in other embodiments, it is also feasible that, when the shooting parameter of the imaging device is edited at one node, the imaging device shoots according to the edited shooting parameter for the whole flight route.

S107: The edited new flight trajectory, the edited attitude information of the unmanned aerial vehicle, the edited attitude information of the imaging device, and the edited shooting parameter of the imaging device are transmitted to the unmanned aerial vehicle to cause the unmanned aerial vehicle to fly according to the new flight trajectory and the new attitude, each axis of the gimbal to rotate according to the edited rotation angle, and the imaging device to take a photograph according to the edited shooting parameter.

In this embodiment, the edited new flight trajectory, the edited attitude information of the imaging device, and the edited shooting parameter are transmitted to a main controller of the unmanned aerial vehicle through a data line. In other implementation manners, they may also be sent through wireless transmission, which is not limited to this embodiment.

Figure 3:
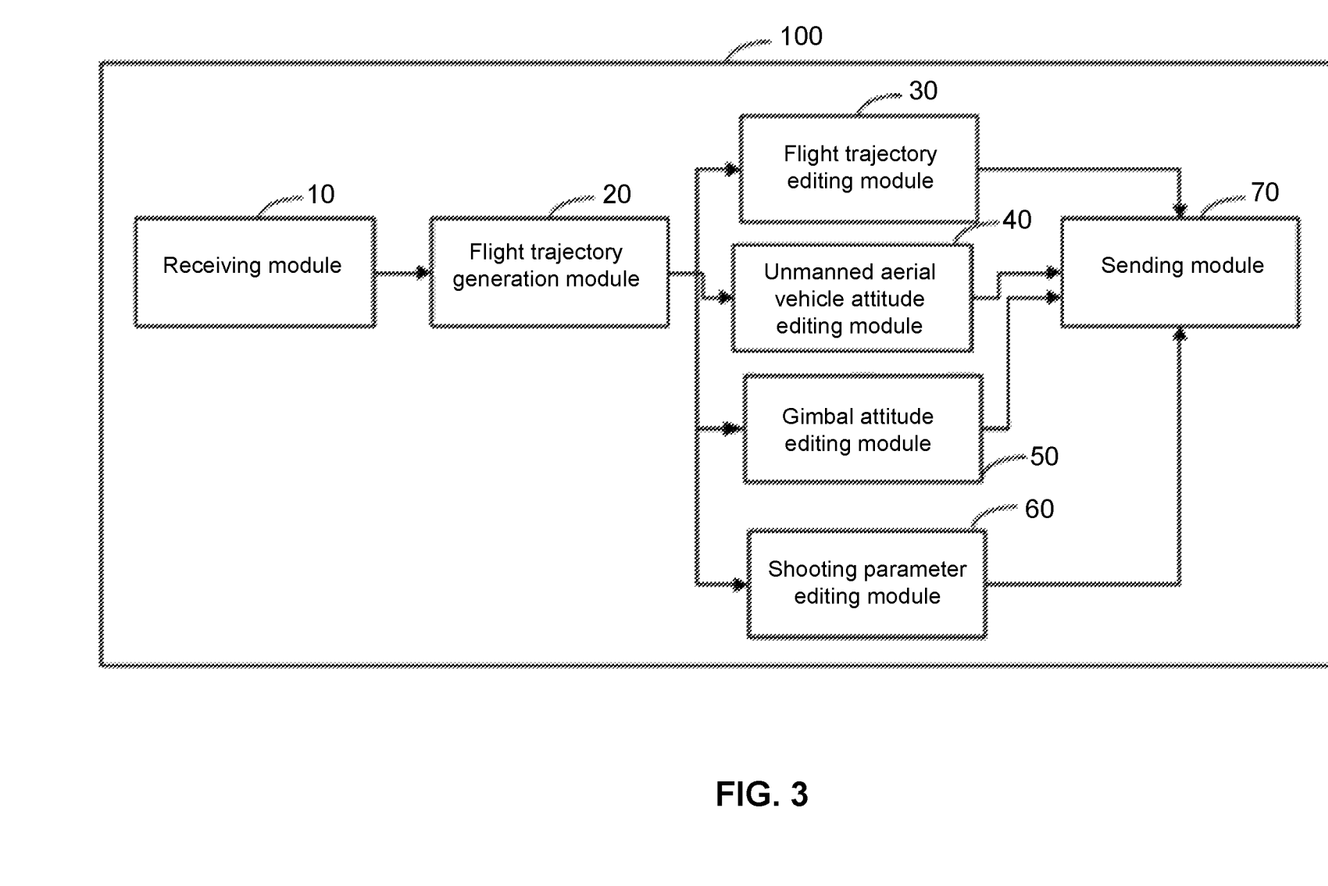
FIG. 3 is a functional module diagram of a heading generation system of an unmanned aerial vehicle according to an embodiment of the present invention.

Referring to FIG. 3, a flight route automatic generation system 100 of an unmanned aerial vehicle according to an embodiment of the present invention includes a receiving module 10, a flight trajectory generation module 20, a flight trajectory editing module 30, an unmanned aerial vehicle attitude editing module 40, a gimbal attitude editing module 50, a shooting parameter editing module 60, and a transmission module 70.

The unmanned aerial vehicle is provided thereon with a gimbal, a GPS positioning device, an inertial measurement unit, an altitude measurement device and the like. The gimbal is used for carrying an imaging device, for example, a video camera, a camera, a telescope, a remote video camera, a measuring instrument or the like, for achieving fixing of the imaging device and randomly adjusting the attitude of the imaging device (for example, a tilt angle and a shooting direction of the imaging device are changed) to achieve high-quality shooting and/or photographing and the like. The gimbal is also provided thereon with an attitude sensor (GCU/IMU) for sensing the attitude of the gimbal.

In this embodiment of the present invention, an operator of the unmanned aerial vehicle remotely controls the unmanned aerial vehicle to fly in the vicinity of a target to collect related waypoint information of shooting and selecting a point of view. In some key places, the flight operator controls the unmanned aerial vehicle to hover, and the operator adjusts the position and attitude of the unmanned aerial vehicle, the attitude of the gimbal, and shooting parameters of the imaging device similarly to the traditional fixed-point photographing. As there is plenty of time and scenes are independent of one another, the photographer can establish a point of view of a high quality. The GPS positioning device of the unmanned aerial vehicle is used for acquiring the position information of the unmanned aerial vehicle, and the inertial measurement unit is used for measuring flight attitudes information of the unmanned aerial vehicle.

When the unmanned aerial vehicle is in the course of flight, the GPS positioning device collects positioning data of the unmanned aerial vehicle, the altitude measurement device collects flight altitude information of the unmanned aerial vehicle simultaneously, and the inertial measurement unit collects flight attitude information of the unmanned aerial vehicle.

The receiving module 10 is used for receiving and recording positioning data of the unmanned aerial vehicle for the preliminary flight, flight altitude information of the unmanned aerial vehicle, flight attitude information of the unmanned aerial vehicle, shooting angle information of an imaging device, a shooting parameter of the imaging device, and image information of an image captured by the imaging device.

The flight trajectory generation module 20 is used for calculating a flight trajectory of the unmanned aerial vehicle according to the positioning data of the unmanned aerial vehicle, the flight altitude information of the unmanned aerial vehicle, and the attitude information of the unmanned aerial vehicle received by the receiving module 10.

In this embodiment, the flight trajectory generation module 20 generates the flight trajectory with methods of fitting a continuous trajectory according to points in discrete positions in a coordinate system, as specifically set forth below.

A first method is that the flight trajectory generation module 20 connects points in adjacent positions in a coordinate system with a straight line. That is, it is a method of linear interpolation. When there are enough sampling points on a curve trajectory, a line passing through the sampling points can be regarded as an approximate trajectory.

A second method is that the flight trajectory generation module 20 approximately locates the flight trajectory of the unmanned aerial vehicle by smoothly transitioning collected discrete point data to form a smooth curve. That is, it is a method of nonlinear interpolation. At present, what is widely applied to engineering is polynomial interpolation, and such a method can reduce errors between a fitted curve and an actual trajectory curve to some extent.

In this embodiment, the flight trajectory is a Bezier curve. The flight trajectory includes a plurality of nodes corresponding to the positions where the unmanned aerial vehicle hovers.

In other embodiments, the waypoints may also only include positioning data and flight altitude information of the unmanned aerial vehicle, but does not include flight attitude information of the unmanned aerial vehicle. Therefore, the flight trajectory generation module 20 calculates the flight trajectory of the unmanned aerial vehicle using only the positioning data and flight altitude information of the unmanned aerial vehicle.

To obtain a new flight trajectory, the flight trajectory editing module 30 is used for editing the flight trajectory of the unmanned aerial vehicle calculated by the flight trajectory generation module 20.

In this embodiment, when the operator randomly clicks a point on the flight trajectory through a mouse cursor, the computer may display, in combination with a map, positioning data and flight altitude information of the unmanned aerial vehicle at the point of the trajectory, attitude information of the unmanned aerial vehicle, attitude information of the imaging device, and an image captured by the imaging device corresponding to the point.

The flight trajectory includes a plurality of nodes corresponding to the positions where the unmanned aerial vehicle hovers, for example, as shown in FIG. 2, a node 1, a node 2, a node 3, a node 4, a node 5 and a node 6. The operator can see, on the computer, positioning data and flight altitude information of the unmanned aerial vehicle at any point of the trajectory, the attitude information of the unmanned aerial vehicle, the attitude information of the imaging device, and the image captured by the imaging device corresponding to the point. Therefore, on the premise that the flight trajectory is not a straight line, when the operator hopes that the unmanned aerial vehicle does not pass through the node 2 the next time it flies, the operator directly connects two adjacent nodes of the node not to be passed, for example, the node 1 and the node 3, with a straight line to generate a smooth optimized flight route between the node 1 and the node 3.

Under other circumstances, when the operator hopes that the unmanned aerial vehicle does not pass through the node 2 and the node 3 the next time it flies, the flight trajectory editing module 30 directly connects the two nodes thus disconnected in the flight trajectory, for example, the node 1 and the node 4, with a straight line.

It can be understood that the manner in which the flight trajectory editing module 30 edits a new flight trajectory is not limited to the manner of connecting with a straight line, and it is also feasible to adopt a manner of editing the flight trajectory between any two nodes into a Bezier curve to generate a smooth optimized flight route. Using a Bezier curve to achieve fitting has the following reasons. One reason is that it is very convenient to define a curve trajectory through Bezier control points. Since it happens to be that the control points can be combined with characteristics of the aircraft in an actual movement (for example, velocity, direction and the like), it is natural that the flight trajectory can be more closely approximated. The other reason is that the Bezier curve may also maintain good smoothness in piecewise interpolation, and the overall effect is better than other piecewise interpolation methods.

The unmanned aerial vehicle attitude editing module 40 is used for editing the attitude of the unmanned aerial vehicle.

When the waypoints further include flight attitude information of the unmanned aerial vehicle, the unmanned aerial vehicle attitude editing module 40 edits the flight attitude information of the unmanned aerial vehicle, for example, pitch angle information, roll angle information, and yaw angle information of the unmanned aerial vehicle. In this embodiment, when the unmanned aerial vehicle attitude editing module 40 edits the attitude information of the unmanned aerial vehicle at one node, the unmanned aerial vehicle acts according to the edited attitude from that node to the next node. It can be understood that, in other embodiments, it is also feasible that, when the unmanned aerial vehicle attitude editing module 40 edits the attitude information of the unmanned aerial vehicle at one node, the unmanned aerial vehicle acts according to the edited attitude of the unmanned aerial vehicle for the whole flight route.

The gimbal attitude editing module 50 is used for editing attitude information of the imaging device.

In this embodiment, the gimbal on the unmanned aerial vehicle is a three-axis gimbal, which includes a pitch axis, a roll axis and a yaw axis. The imaging device is disposed on the gimbal and is rotatable with rotation of the gimbal. For any node, the gimbal attitude editing module 50 edits a rotation parameter of the gimbal with reference to shooting angle information of the imaging device and image information of an image captured by the imaging device received and recorded by the receiving module 10. That is, a rotation angle of the three axes is edited as required. In this embodiment, when the gimbal attitude editing module 50 edits attitude information of the gimbal at one node, the gimbal acts according to the edited rotation parameter of the gimbal from that node to the next node. It can be understood that, in other embodiments, it is also feasible that, when the gimbal attitude editing module 50 edits attitude information of the gimbal at one node, the gimbal acts according to the edited rotation parameter of the gimbal for the whole flight route. The gimbal attitude editing module 50 may also edit attitude information of the gimbal respectively at a plurality of nodes at the same time, which is not limited to this embodiment.

In other embodiments, the gimbal may also be a single-axis or two-axis gimbal.

The shooting parameter editing module 60 is used for editing the shooting parameter of the imaging device. The shooting parameter includes the size of the aperture, the size of the shutter and the like. In this embodiment, when the shooting parameter editing module 60 edits the shooting parameter of the imaging device at one node, the imaging device shoots according to the edited shooting parameter from that node to the next node. It can be understood that, in other embodiments, it is also feasible that, when the shooting parameter editing module 60 edits the shooting parameter of the imaging device at one node, the imaging device shoots according to the edited shooting parameter for the whole flight route.

The transmission module 70 is used for transmitting the new flight trajectory edited by the flight trajectory editing module 30, the attitude information of the unmanned aerial vehicle edited by the unmanned aerial vehicle attitude editing module 40, the attitude information of the imaging device edited by the gimbal attitude editing module 50, and the shooting parameter of the imaging device edited by the shooting parameter editing module 60 to the unmanned aerial vehicle to cause the unmanned aerial vehicle to fly according to the new flight trajectory and each axis of the gimbal to rotate according to the edited rotation angle.

The heading generation method and system of an unmanned aerial vehicle can replace manual real-time precise control over the aircraft at a shooting site to greatly shorten the time of man-made flight operation and avoid influences of human factors on the quality of aerial photography. And at the same time, the heading generation method and system of an unmanned aerial vehicle can avoid the blindness caused by setting waypoints on the map, thus guaranteeing the optimal shooting angle and distance and ensuring that the aircraft and its onboard apparatus can rapidly and efficiently complete high-quality aerial photography assignments.

In the several embodiments provided in the present invention, it should be understood that the disclosed system, device and method may be implemented in another manner. The described device embodiments above are only schematic. For example, division of the module or unit is merely division of a logical function, and division in another manner may exist in actual implementation. For example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the devices or units may be implemented electrically, mechanically or in another form.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part that makes contributions to the prior art, or all or a part of the technical solutions may be embodied in a form of a software product. The computer software product is stored in a storage medium, and includes several instructions for instructing a computer device (which may be a personal computer, a server, or a network device) or a processor to perform all or a part of the steps of the methods described in the embodiments of the present invention. The foregoing storage medium includes: any medium that can store a program code, such as a USB flash drive, a removable hard disk, a Read-Only Memory (ROM), a Random Access Memory (RAM), a magnetic disk, or an optical disc.

The above descriptions are merely embodiments of the present invention, but are not intended to limit the patent scope of the present invention. Any equivalent structure or equivalent process variation made by using contents of the specification and the drawings of the present invention, or directly or indirectly applied to other related technical fields, should be likewise included in the patent protection scope of the present invention.

The invention claimed is:

1. An unmanned aerial vehicle, comprising:
   a recording module for recording flight waypoints of the unmanned aerial vehicle during a preliminary flight, the flight waypoints comprising positioning data and flight altitude information of the unmanned aerial vehicle;
   a transmission module for transmitting the recorded flight waypoints to a ground terminal for generating an edited flight trajectory of the unmanned aerial vehicle; and
   a receiving module for receiving the edited flight trajectory, from the ground terminal, to cause the unmanned aerial vehicle to fly according to the edited flight trajectory after the preliminary flight is made.

2. The unmanned aerial vehicle according to claim 1, wherein the flight waypoints further comprise an attitude information of the unmanned aerial vehicle, and the receiving module is configured to receive an edited attitude information, from the ground terminal, to cause the unmanned aerial vehicle to fly according to the edited attitude information.

3. The unmanned aerial vehicle according to claim 1, wherein the unmanned aerial vehicle is provided with an imaging device, and wherein the recording module is configured to record an attitude information of the imaging device.

4. The unmanned aerial vehicle according to claim 3, wherein the imaging device is disposed on a gimbal on the unmanned aerial vehicle, and the receiving module is configured to receive an edited attitude information of the imaging device, from the ground terminal, to cause the gimbal to rotate according to the edited attitude information of the imaging device.

5. The unmanned aerial vehicle according to claim 3, wherein the recording module is configured to record a shooting parameter of the imaging device, and the receiving module is configured to receive an edited shooting parameter, from the ground terminal, to control the imaging device to take a photograph according to the edited shooting parameter.

6. The unmanned aerial vehicle according to claim 1, wherein the edited flight trajectory has been generated by polynomial interpolation of a subset of the flight waypoints.

7. The unmanned aerial vehicle according to claim 1, wherein the edited flight trajectory has been generated by linear interpolation of a subset of the flight waypoints.

8. The unmanned aerial vehicle according to claim 1, wherein the edited flight trajectory has been generated by optimizing a smooth flight route between two disconnected flight waypoints.

9. A terminal in communication with an unmanned aerial vehicle, the terminal comprising:
   a receiving module for receiving flight waypoints of the unmanned aerial vehicle, the flight waypoints comprising positioning data and flight altitude information of the unmanned aerial vehicle during a preliminary flight of the unmanned aerial vehicle;

a flight trajectory generation module for calculating a flight trajectory according to the flight waypoints;

a flight trajectory editing module for editing the flight trajectory to obtain a new flight trajectory; and a transmission module for transmitting the new flight trajectory to the unmanned aerial vehicle to cause the unmanned aerial vehicle to fly according to the new flight trajectory after the preliminary flight is made.

10. The terminal according to claim 9, further comprising:
an attitude editing module for editing an attitude information of the unmanned aerial vehicle, wherein the transmission module is configured to transmit the edited attitude information of the unmanned aerial vehicle to the unmanned aerial vehicle to cause the unmanned aerial vehicle to fly according to the edited attitude.

11. The terminal according to claim 10, wherein the attitude editing module is configured to edit at least one of pitch angle information, roll angle information, or yaw angle information of the unmanned aerial vehicle.

12. The terminal according to claim 9, further comprising:
a gimbal attitude editing module for editing an attitude information of an imaging device disposed on a gimbal provided on the unmanned aerial vehicle, wherein the transmission module is configured to transmit the edited attitude information of the imaging device to the unmanned aerial vehicle to cause the gimbal to rotate according to the edited attitude information of the imaging device.

13. The terminal according to claim 9, further comprising:
a shooting parameter editing module for editing a shooting parameter of an imaging device provided on the unmanned aerial vehicle, wherein the transmission module is configured to transmit the edited shooting parameter of the imaging device to the unmanned aerial vehicle to cause the imaging device to take a photograph according to the edited shooting parameter.

14. The terminal according to claim 9, wherein the flight trajectory editing module is configured to obtain the new flight trajectory by generating a flight route between two disconnected waypoints in a manner by linear interpolation.

15. The terminal according to claim 9, wherein the flight trajectory editing module is configured to obtain the new flight trajectory by generating a smooth optimized flight route between two disconnected waypoints in a manner of editing the flight trajectory into a Bezier curve.

16. A heading generation method of an unmanned aerial vehicle, comprising the steps of:
receiving flight waypoints of the unmanned aerial vehicle, the flight waypoints comprising positioning data and flight altitude information of the unmanned aerial vehicle during a preliminary flight of the unmanned aerial vehicle;

calculating a flight trajectory according to the flight waypoints received during the preliminary flight;

editing the flight trajectory to obtain a new flight trajectory; and transmitting the edited new flight trajectory to the unmanned aerial vehicle to cause the unmanned aerial vehicle to fly according to the new flight trajectory after the preliminary flight is made.

17. The heading generation method according to claim 16, wherein the calculating a flight trajectory is by fitting a continuous trajectory through the waypoints by polynomial interpolation.

18. The heading generation method according to claim 16, wherein the calculating a flight trajectory is by fitting a continuous trajectory through the waypoints by linear interpolation.

19. The heading generation method according to claim 16, further comprising:
recording at least one of an attitude information or a shooting parameter of an imaging device, and displaying, in combination with a map, positioning data and flight altitude information of the unmanned aerial vehicle at one point of the flight trajectory, and at least one of the attitude information or the shooting parameter of the imaging device corresponding to the point of the flight trajectory.

* * * * *